United States Patent
Grinderslev

(10) Patent No.: US 10,036,857 B2
(45) Date of Patent: Jul. 31, 2018

(54) EXPANDED BEAM CONNECTOR WITH DISCRETE ALIGNMENT ASSEMBLY

(71) Applicant: TE CONNECTIVITY CORPORATION, Berwyn, PA (US)

(72) Inventor: Soren Grinderslev, Hummelstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/208,910

(22) Filed: Jul. 13, 2016

(65) Prior Publication Data
US 2017/0052329 A1    Feb. 23, 2017

Related U.S. Application Data

(63) Continuation-in-part of application No. 14/832,741, filed on Aug. 21, 2015, now abandoned.

(51) Int. Cl.
*G02B 6/38*   (2006.01)
*G02B 6/32*   (2006.01)

(52) U.S. Cl.
CPC ......... *G02B 6/3877* (2013.01); *G02B 6/3846* (2013.01); *G02B 6/3874* (2013.01); *G02B 6/32* (2013.01)

(58) Field of Classification Search
CPC .. G02B 6/3846; G02B 6/3853; G02B 6/3855; G02B 6/3874; G02B 6/3877
See application file for complete search history.

(56) References Cited

U.S. PATENT DOCUMENTS

| | | | | |
|---|---|---|---|---|
| 4,707,067 A | * | 11/1987 | Haberland | G02B 6/4204 257/E31.117 |
| 4,781,431 A | * | 11/1988 | Wesson | G02B 6/32 385/61 |
| 4,889,399 A | * | 12/1989 | Mariani | G02B 6/32 385/35 |
| 5,022,733 A | * | 6/1991 | Angenent | G02B 6/327 385/35 |
| 5,293,438 A | * | 3/1994 | Konno | G02B 6/2552 385/35 |
| 7,048,449 B2 | * | 5/2006 | Frojdh | G02B 6/32 385/88 |
| 7,474,822 B2 | * | 1/2009 | Kobayashi | G02B 6/325 385/35 |
| 7,722,261 B2 | * | 5/2010 | Kadar-Kallen | G02B 6/32 385/72 |

(Continued)

OTHER PUBLICATIONS

European Search Report, dated Jan. 24, 2017, EP 16 18 4913, Application No. 16184913.8-1553.

*Primary Examiner* — Daniel Petkovsek

(57) ABSTRACT

An alignment assembly for disposition in an insert for an expanded beam connector, said alignment assembly comprising: (a) at least one cylindrical sleeve having an inner first diameter, and an outer diameter configured to be received in said insert of said connector; (b) a lens disposed in said sleeve, and having a round periphery with a second diameter larger than said first diameter; and (c) wherein said sleeve is configured to at least partially accept a ferrule having a round periphery with a third diameter essentially the same as the second diameter, said ferrule comprising a fiber for optically coupling with said lens.

2 Claims, 5 Drawing Sheets

(56) References Cited

U.S. PATENT DOCUMENTS

| | | |
|---|---|---|
| 7,775,725 B2 | 8/2010 | Grinderslev |
| 8,123,417 B2 * | 2/2012 | Wertman .............. G02B 6/3869 385/60 |
| 8,556,521 B2 | 10/2013 | Everett et al. |
| 8,824,841 B1 | 9/2014 | Mullen |
| 9,039,291 B2 * | 5/2015 | Doit .......................... G02B 6/32 385/72 |
| 2005/0220410 A1 * | 10/2005 | Thompson .............. G02B 6/421 385/39 |
| 2009/0324175 A1 * | 12/2009 | Everett .................... G02B 6/32 385/72 |
| 2010/0027943 A1 | 2/2010 | Armani et al. |
| 2010/0303422 A1 * | 12/2010 | Wertman .............. G02B 6/3869 385/79 |
| 2012/0155807 A1 | 6/2012 | Knapp |
| 2013/0004128 A1 * | 1/2013 | Zhang ................. G02B 6/3846 385/79 |
| 2013/0039622 A1 * | 2/2013 | Grinderslev ......... G02B 6/3874 385/61 |

\* cited by examiner

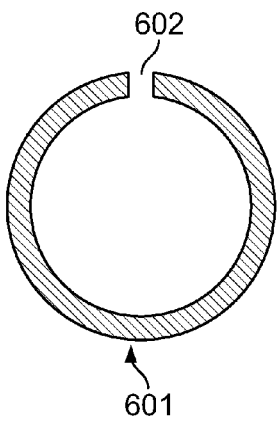
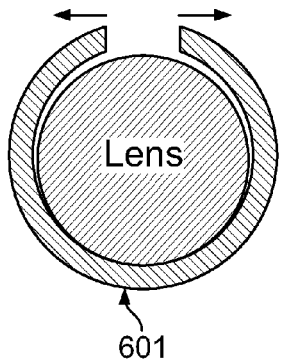
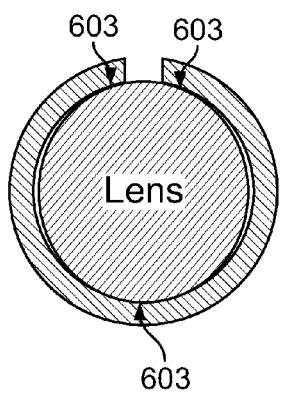
FIG. 6A  FIG. 6B  FIG. 6C
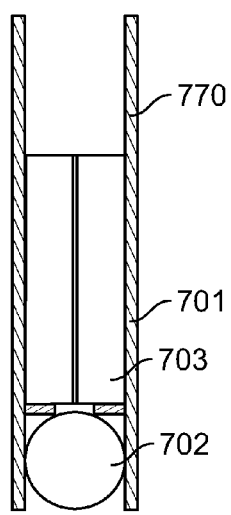
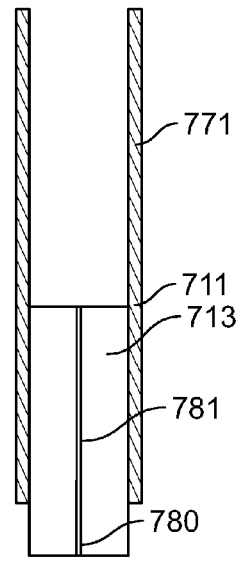
FIG. 7A  FIG. 7B
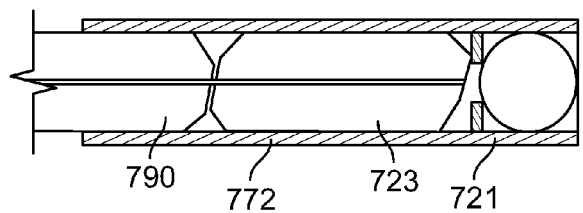
FIG. 7C

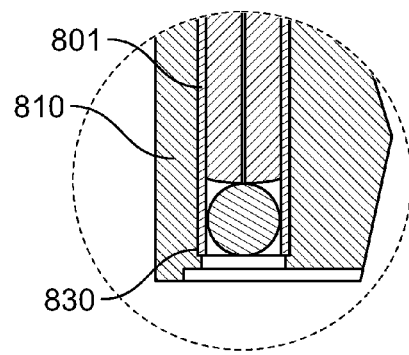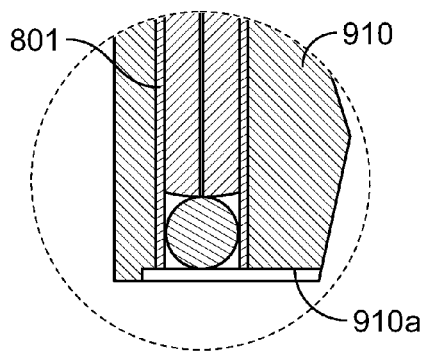
FIG. 9(a)　　　　FIG. 9(b)
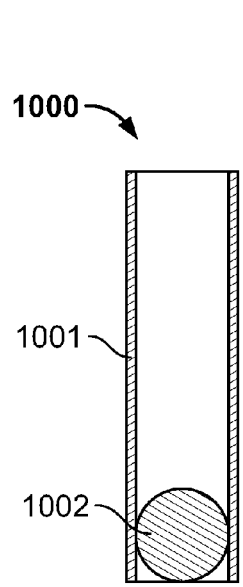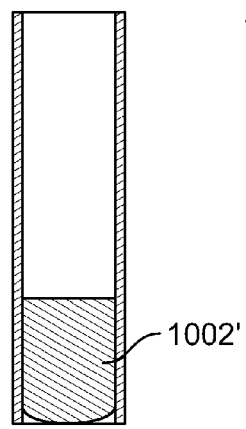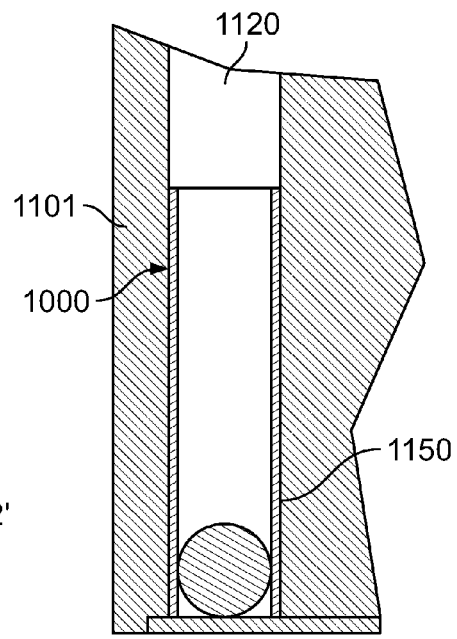
FIG. 10(a)　FIG. 10(b)　　　FIG. 11

EXPANDED BEAM CONNECTOR WITH DISCRETE ALIGNMENT ASSEMBLY

CROSS-REFERENCE TO RELATED APPLICATION

This application is a continuation in part of U.S. patent application Ser. No. 14/832,741, filed Aug. 21, 2015, hereby incorporated by reference.

FIELD OF DISCLOSURE

The present invention relates generally to an optical connector, and, more specifically, to an expanded beam optical connector.

BACKGROUND

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration and/or dirty environments, where "physical contact" between the fiber and the light path of mating connector is problematic. Specifically, in dirty environments, particulates may become trapped between connectors during mating. Such debris has a profoundly detrimental effect on the optical transmission since the particles are relatively large compared to the optical path (e.g., 10 microns diameter in single mode) and are therefore likely to block at least a portion of the optical transmission. Furthermore, in high-vibration environments, optical connectors having ferrules in physical contact tend to experience scratching at their interface. This scratching diminishes the finish of the fiber end face, thereby increasing reflective loss and scattering.

To avoid problems of debris and vibration, a connector has been developed which expands the optical beam and transmits it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing which is configured to mate with the outer housing of a mating connector, typically through a screw connection. Contained within the outer housing are a number of inner assemblies or "inserts." Each insert comprises an insert housing, a cable assembly contained within the insert housing, and a ball lens at a mating end of the insert housing optically connected to at least one fiber of the cable assembly. The ball lens serves to expand and collimate light at the connector interface. When two expanded beam connectors are mated, there is an air gap between the ball lenses of each pair of optically coupled inserts.

Tyco Electronics Corporation (Harrisburg, Pa.) currently offers a line of expanded beam connectors under the brand name PRO BEAM®. This connector and improvements thereto are described in U.S. Pat. No. 7,722,261, hereby incorporated by reference. The current design uses a 3.0 mm ball lens mounted on the front end of the insert cavity and affixed with epoxy. A cable assembly having a ferrule holding at least one fiber is produced separately, and is mounted into the insert with the ferrule optically coupled with the ball lens. In the single mode design, the ferrule brings the fiber endface in contact with the ball lens in order to achieve a high return loss.

Although the multimode (MM) and single mode (SM) expanded beam connectors offered by Tyco Electronics Corporation have consistently met industry requirements, applicants have identified a need for improved manufacturability. For example, the insert is machined with a radiused, annular ridge to seat the ball lens. This radiused seat must be machined with close tolerance (e.g. 2 μm) relative to the position of the ferrule tip. Not only is machining such a curved seat challenging, but also verifying its tolerance compliance is error prone. Thus, the existing verification process tends to be unreliable such that the tolerance compliance of the assembly is not known with any real certainty until the final optical measurement is performed on the product. Determining noncompliance at this stage of manufacture is inefficient and wasteful.

Additionally, during insertion of the cable assembly into the cavity, often the ferrule scrapes along the sidewall of the insert's borehole, creating shavings or debris. This debris may settle on the ferrule end face in a way that can degrade the signal and the return loss. Due to the presence of machining tolerances and the difficulty of verification, it is often required that tuning is applied in order to align the fiber axis of the cable assembly with the axis of the lens.

Therefore, there is a need to improve the manufacturability of the conventional expanded beam product. The present invention fulfills this need among others.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an "alignment assembly," which is discrete from the insert. The alignment assembly facilitates the critical alignment of the lens and fiber, both axially and radially, independent of the insert. In other words, the insert is not machined to hold and position the lens or ferrule. Rather, the alignment is achieved in the discrete alignment assembly using a simple cylindrical resilient sleeve. The sleeve is configured to receive a lens and a ferrule and/or ferrule stub, all having essentially the same diameter. The sleeve has an internal diameter close to that of the optical components (i.e. the lens and the ferrule/ferrule stub), but is slightly undersized, thus creating a centering clamping force. When the optical components are mounted inside the split sleeve, the expansion due to the slight size difference causes the centering force to be applied to the optical components, causing them to align relative to each other.

The alignment assembly provides for a number of advantages. For example, because the alignment of the lens is performed externally—independent of the insert—the need to machine the insert to exacting tolerances is alleviated, resulting in simpler manufacturing with sufficient metrology. Likewise, because the need to insert a cable assembly in a tightly tolerance borehole in the insert is eliminated, no contact exists between the ceramic ferrule and the metal insert walls, thus, the source of contamination from scrapings mentioned above is eliminated.

Furthermore, because the alignment of the optical components is performed in the discrete sleeve, which is easily handled and inspected, it is simple to verify optically the alignment of the components before the alignment assembly is mounted into the insert cavity. Thus, aligning the components in the discrete alignment assembly provides a higher acceptance rate of connectors with less scrap.

Additionally, in one embodiment, the ferrule is an easily-handled ferrule stub, which provides for a number of advantages. Some of the advantages arise from the ability of the ferrule stub to be manufactured and treated in bulk. For example, multiple stubs can be polished simultaneously to provide the desired endface characteristics including, for example, flat, angled and domed endfaces. Additionally, in one embodiment, the stubs can be coated with an antireflective (A/R) coating in bulk. While it may be cumbersome to A/R coat the ferrule end face of a cable assembly due to its lack of maneuverability, large batches of short, easily-handled ferrule stubs can be A/R coated together, thus realizing economies of scale and lower cost. As discussed below, A/R coating allows for less expensive components to be used and enables the same connector configured to be used for SM and MM applications over a wide range of operating wavelengths.

Furthermore, in another embodiment, rather than a ferrule stub, the ferrule is a ferrule of the cable assembly, which is received in the sleeve such that it optically couples directly with the lens, and in one particular embodiment, physically contacts the lens. One advantage of this embodiment is that that the cost and complexity of a discrete ferrule stub is avoided. Additionally, because the fiber in the ferrule physically contacts the lens in one embodiment, there is no need for an A/R coating on the lens/fiber or a spacer between the lens and the ferrule, which also reduces costs/complexity. Thus, this embodiment tends to be less expensive and more readily manufactured than the embodiment with the fiber stub.

Accordingly, one aspect of the invention is a discrete alignment assembly for insertion into an insert of an expanded beam connector. In one embodiment, the alignment assembly comprises: (a) at least one cylindrical sleeve having an inner first diameter, and an outer diameter configured to be received in the insert of the connector; (b) a lens disposed in the sleeve, and having a round periphery with a second diameter larger than the first diameter; and (c) a ferrule/ferrule stub disposed at least partially in the sleeve, and having a round periphery with a third diameter essentially the same as the second diameter, the ferrule/ferrule stub comprising a fiber/fiber stub optically coupled to the ball lens.

Another aspect of the invention is an expanded beam connector having a discrete alignment assembly. In one embodiment, the connector comprises: (a) an insert for insertion into an outer housing, the insert having at least one bore hole for receiving an alignment subassembly; (b) an alignment subassembly comprising at least: (i) at least one cylindrical sleeve having an inner first diameter, and an outer diameter configured to be received in the borehole of the insert; (ii) a lens disposed in the sleeve, and having a round periphery with a second diameter larger than the first diameter; and (iii) a ferrule/ferrule stub disposed at least partially in the sleeve, and having a round periphery with a third diameter essentially the same as the second diameter, the ferrule/ferrule stub comprising a fiber/fiber stub optically coupled to the ball lens.

Yet another aspect of the invention is a method of assembling the expanded beam connector having a discrete alignment subassembly. In one embodiment, the method comprises the steps of (a) preparing an alignment assembly outside of an insert by at least inserting a lens in a sleeve, the sleeve being cylindrical having an inner first diameter, and an outer diameter configured to be received in a borehole of an insert, the lens having a round periphery with a second diameter larger than the first diameter such that the sleeve expands to receive the lens; (b) inserting the alignment assembly in the insert; and (c) inserting a ferrule in the alignment assembly, the ferrule having a round periphery with a third diameter essentially the same as the second diameter such that the sleeve expands to receive the ferrule and squeeze the ferrule to align it within the sleeve such that a fiber in the ferrule is optically coupled to the lens.

BRIEF DESCRIPTION OF DRAWINGS

FIGS. 6(a)-(c) shows schematics of a split alignment sleeve receiving a lens.

FIGS. 7(a)-(c) illustrate different alignment approaches.

FIG. 9(a) is a close up view of the alignment assembly of FIG. 8 seated on a shoulder of the housing to position the alignment assembly in the housing, while FIG. 9(b) shows and alternative embodiment, in which the housing does not have a shoulder and the alignment assembly is flush with the front of the housing.

FIGS. 10(a) and (b) show an alternative embodiment of the alignment assembly, similar to that of FIGS. 1(a) and (b), respectively, but without the ferrule stub.

FIG. 11 shows the alignment assembly of FIG. 10 disposed in an insert.

DETAILED DESCRIPTION

Figure 1A:
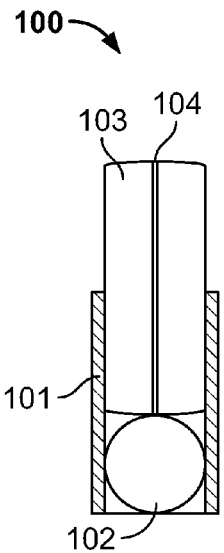
FIGS. 1(a) and (b) show one embodiment of the alignment assembly of the present invention with a ball lens and with a cylindrical lens, respectively.
Figure 1B:
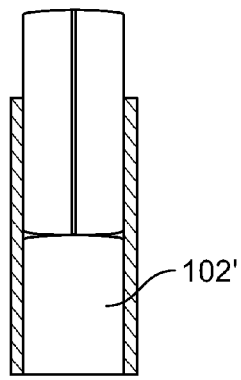

Referring to FIGS. 1(a) & 1(b) and FIGS. 10(a) and (b) embodiments are shown of an alignment assembly 100, 1000 for insertion into an insert of an expanded beam connector. As used herein the term "connector" refers to any device used to join a segment of the conductor to (1) another conductor segment, (2) an active device such as a photonic radiation source, detector, or repeater, and (3) a passive device, such as switch, multiplexer, or attenuator. A typical optical fiber connector comprises housing and a cable assembly within the housing. The cable assembly comprises a ferrule, which has one or more bore holes to accommodate fibers, and a fiber secured in each bore hole such that the end of the fiber is presented for optical coupling by the ferrule. The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with optical pathway of the mating structure. This way, light from the fiber is optically coupled to the optical pathway.

For illustrative purposes, the alignment assembly is described in connection with an insert for a ruggedized connector as described above, although it should be understood that the invention is not limited to this embodiment (unless otherwise indicated), and may be embodied alternatively in a discrete connector (i.e., a single ferrule connector) or be integral to an optical device such as a transceiver.

The alignment assemblies 100, 1000 shown in FIGS. 1(a) & 1(b), and FIG. 10 comprise: (a) at least one cylindrical sleeve 101, 1001 having an inner first diameter, and an outer diameter configured to be received in the insert 401 (see FIG. 4), 810 (see FIG. 8) of the connector; (b) a lens 102, 1002 (FIG. 1(a), 10(a), 102', 1002' (FIG. 1(b), 10(b)) disposed in the sleeve 101, 1001 and having a round periphery with a second diameter larger than the first diameter; and (c) a ferrule (e.g., a ferrule stub 103 or ferrule 803 of a cable assembly 880 (see FIG. 8)) disposed at least partially in the sleeve 101, 1001, and having a round periphery with a third diameter essentially the same as the second diameter. The ferrule 803 or ferrule stub 103 comprises a fiber 804 or fiber stub 104 optically coupled to the ball lens. Lenses 102 and 802 are ball lenses, while lens 102' is a cylindrical lens.

Figure 5:
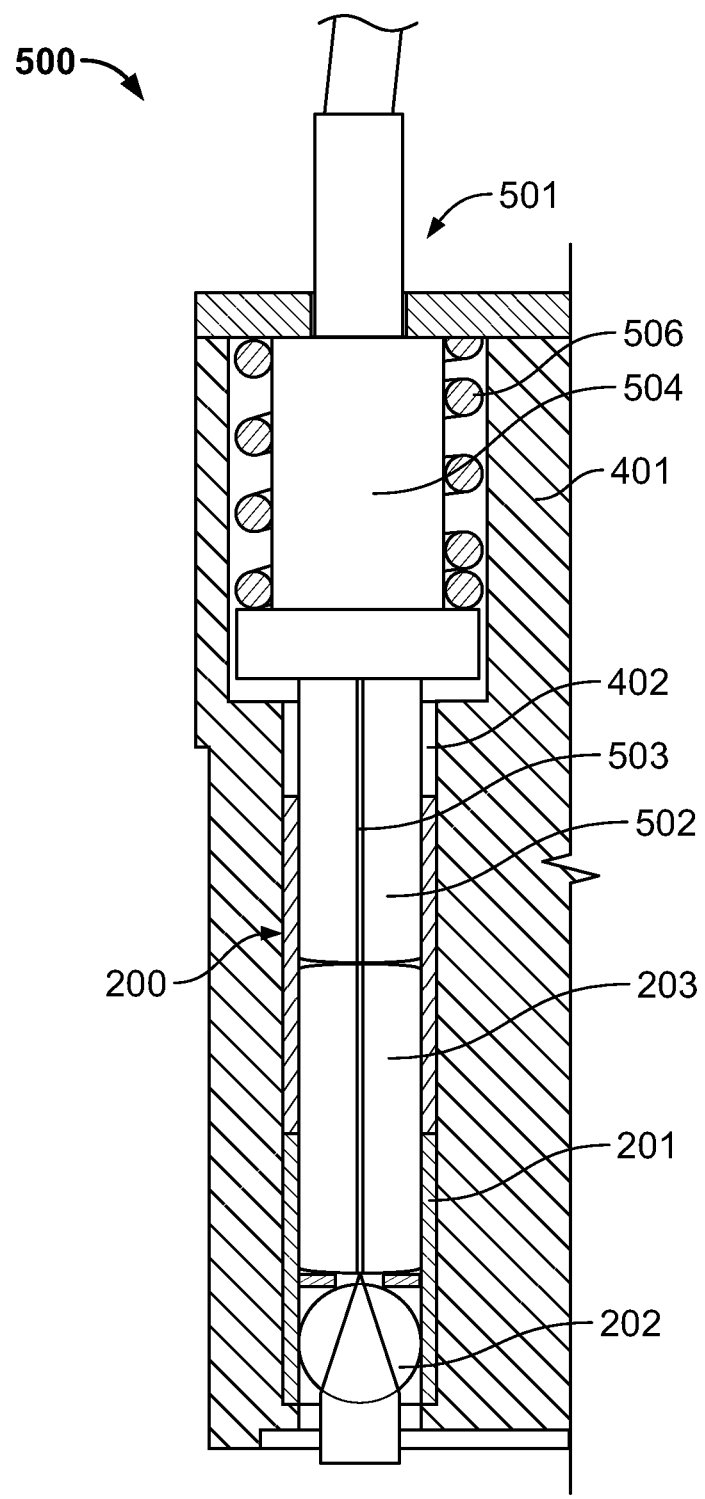
FIG. 5 shows the alignment assembly of FIG. 3 disposed in an insert and optically coupled with a cable assembly

Referring to FIG. 5, an embodiment of the expanded beam connector 500 of the present invention using a ferrule stub is shown. The expanded beam connector 500 comprises: (a) an insert 401 for insertion into an outer housing (not shown), the insert having at least one bore hole 402 for receiving an alignment assembly; (b) the alignment assembly 200 comprising at least: (i) at least one cylindrical sleeve 201 having an inner first diameter, and an outer diameter configured to be received in the borehole 402 of the insert 401; (ii) a lens 202 disposed in the sleeve, and having a round periphery with a second diameter larger than the first diameter; and (iii) a ferrule stub 203 disposed at least partially in the sleeve 201, and having a round periphery with a third diameter essentially the same as the second diameter, the ferrule stub comprising a fiber stub optically coupled to the ball lens; and (c) a cable assembly comprising at least a ferrule 502 having a borehole and at least one fiber 503 disposed in the borehole such that an end face of the fiber is disposed at an end face of the ferrule and optically coupled with the fiber stub in the ferrule stub. In one embodiment, the cable assembly also comprises a ferrule holder 504 and a spring 506 to bias the ferrule forward relative to the ferrule holder to urge against the ferrule stub to achieve physical contact.

Figure 8:
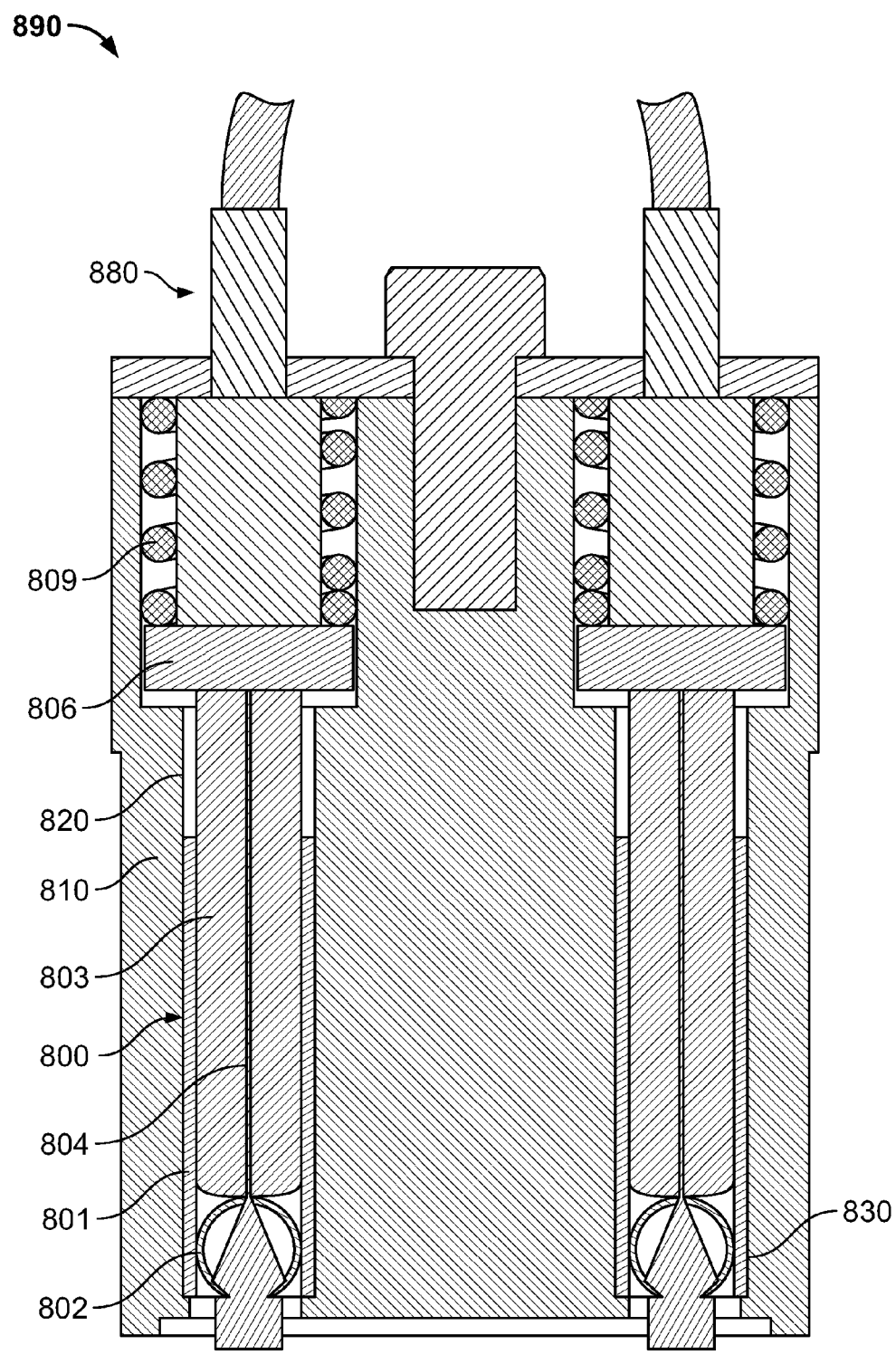
FIG. 8 shows an embodiment in which there is no ferrule stub, and the ferrule of the cable assembly physically contacts the lens directly.

Referring to back to FIG. 8, another embodiment of the expanded beam connector 890 is shown in which the alignment assembly 800 is configured such that the ferrule 803 of the cable assembly 880 optically couples with the lens 802 directly without the use of a ferrule stub. Specifically, the expanded beam connector 890 comprises: (a) an insert 810 for insertion into an outer housing (not shown), the insert having at least one bore hole 820 for receiving the alignment assembly 800; (b) the alignment assembly 800 comprising at least: (i) at least one cylindrical sleeve 801 having an inner first diameter, and an outer diameter configured to be received in the borehole 820 of the insert 810; and (ii) a lens 802 disposed in the sleeve, and having a round periphery with a second diameter larger than the first diameter; and (c) a cable assembly 880 comprising at least the ferrule 803 disposed at least partially in the sleeve 801, the ferrule 803 having a round periphery with a third diameter essentially the same as the second diameter, and having a borehole and at least one fiber 804 disposed in the borehole such that an end face of the fiber is disposed at an end face of the ferrule and is optically coupled with the lens 802. In one embodiment, the cable assembly also comprises a ferrule holder 806 and a spring 809 to bias the ferrule forward relative to the ferrule holder to urge against the ferrule stub to achieve physical contact.

These components are considered in greater detail below.

Figure 4:
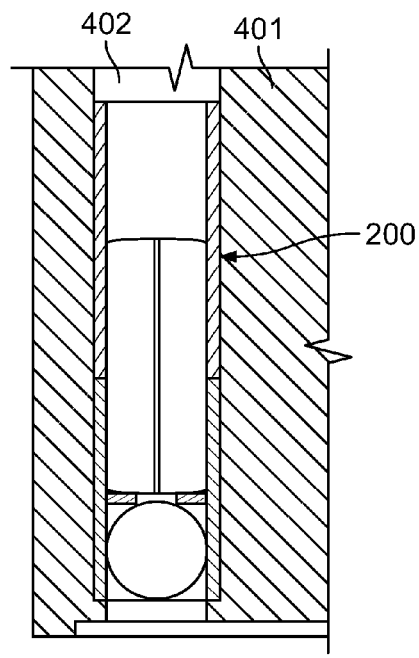
FIG. 4 shows the alignment assembly of FIG. 3 disposed in an insert.

Referring to FIGS. 4 and 11, the insert 401, 1101 functions to hold the alignment assembly 200, 1000 in axial and radial relative positions within the outer housing. The configuration of the insert with respect to the outer housing is well known, subject to various standards, and, thus, is not considered in detail herein.

In one embodiment, the insert 401, 1101 comprises an elongated body having a front and back orientation and defining a borehole 402, 1120 running from front to back. The borehole 402, 1120 is adapted to receive the alignment assembly 200, 1000 from the back end, or from the front end too if using the insert without a shoulder stop. Referring to FIG. 11, in one embodiment, the alignment assembly when mounted in the insert does not make contact with the bore over its entire length. For example, in one embodiment, only the lower section of the alignment sleeve makes contact with the insert—there is a gap 1150 between the alignment assembly and the insert bore at the upper end of the alignment assembly. This gap allows the upper portion of the alignment sleeve to expand to receive the ferrule from the cable assembly. This generally is not be possible or is difficult if the alignment assembly is held tightly by the insert bore or is adhered to the insert bore wall over its entire length. The lower portion of the alignment assembly can be held tightly by the insert bore because that portion is already attached to the lens so there is no need for further flexibility. Thus, in one embodiment, there is clearance between the bore wall and the alignment assembly in the upper ½ or so of the alignment assembly.

The insert alignment assembly may or may not have a shoulder for positioning the alignment assembly. More specifically, referring to FIG. 9(a), which is a close up view of the alignment assembly in the insert of FIG. 8, the alignment assembly 801 is seated on a shoulder 830 of the insert 810 to position the alignment assembly 801 in the insert 810. Alternatively, since the critical alignment of the optical components is performed in the alignment assembly, and not the borehole of the insert, the machining of the borehole is not critical, and, thus, can be a simple, straight borehole with no features. For example, referring to FIG. 9(b), the insert 910 does not have a shoulder and the alignment assembly 801 is flush with the front 910a of the housing 910. In such an embodiment, the alignment assembly may be axially aligned in the borehole simply, for example, by positioning its end to be flush with the front end 910a of the insert, or similar configuration. The advantage of using the no-shoulder design (along with an external positioning fixturing)

leads to a more simplified machining process and also a reduction of the distance between the mated lenses which in most cases is desirable. Furthermore, since the alignment assemblies for the SM and MM have essentially the same physical configuration, in one embodiment, the insert 401, 801 is generic to accept either alignment assembly. Furthermore, the alignment assembly (without fiber stub) can be used equally well for both MM and SM cable assemblies (if a SM lens material is used—focal spot on or near lens surface).

In this particular embodiment, the insert 401, 801 is an insert housing suitable for insertion into a larger multi-connector outer housing such as the PRO BEAM® connectors offered by Tyco Electronics Corporation. It is frequently preferred to configure the insert housing to receive a plurality of ferrule assemblies. Thus, since the SM and MM may be the same, it is within the scope of the invention that an insert housing be populated with both SM and MM ferrule assemblies.

The alignment assembly 100, 800 functions to align the key optical components—i.e., the lens and the fiber—in a subassembly that is discrete from the insert, and, thus, alleviates the need for the insert to perform the alignment function, which, as described above, can be problematic. In one embodiment, the alignment assembly comprises at least a sleeve, a lens and a ferrule and/or ferrule stub (discussed in detail below).

Affixing the alignment assembly to the insert can be performed using any known technique, including, for example, an interference fit, adhesive bond, and welding. Preferably, the alignment assembly is affixed to the housing through an interference fit, using a press fit, which is a simple, straightforward process. Alternatively, rather than a press fit, the insert housing may be heated or the alignment assembly cooled to allow the insert housing to receive the alignment assembly. As the temperature difference between the two decreases, the alignment assembly would be secured in the insert housing by an interference fit. This embodiment allows the assembly to be reheated and the alignment assembly removed and replaced if necessary. In one embodiment, the alignment assembly is actively aligned in the insert and then affixed in the insert with adhesive.

Alternatively, the alignment assembly may be held loosely within the insert, with a mechanical stop or shoulder at the distal (lens) end of the insert, such that the spring pushes the alignment assembly against the mechanical stop. In yet another alternative embodiment, the alignment assembly may be captivated within the insert assembly. Still other embodiments will be known or obvious to one of skill in the art in light of this disclosure.

The sleeve 101, 801 functions to align the lens and the fiber. In one embodiment, in which the ferrule stub is used, the sleeve functions to align the fiber in the ferrule stub with the fiber in the ferrule of the cable assembly, and, in a different embodiment, in which a ferrule stub is not used, the sleeve functions to align the lens directly with the fiber in the ferrule of the cable assembly. The sleeve has various embodiments, although its mechanism for aligning is generally, but not necessarily, the same. Specifically, the sleeve typically has an internal diameter close to that of the two optical elements but slightly undersized thus creating a centering clamping force. Because the diameters of the sleeve and lens are close in size, their mechanical axes will be aligned by the sleeve's clamping forces. Furthermore, the flexibility of the sleeve allows for acceptance of a lens diameter having a generous amount of tolerance.

In one embodiment, the sleeve is a compliant sleeve 601 with a slit 602 as shown in FIG. 6a. When the lens is inserted into the sleeve 601, as shown in FIG. 6b, its inner diameter is forced-splayed sufficiently to accept the slightly larger lens diameter. Because the sleeve is now slightly expanded, and (at a micro-level) is not circular anymore, it will exert a 3-point radial clamping force 603 onto the cylindrical lens surface as shown in FIG. 6c. This results in the lens axis and the sleeve axis coinciding. Epoxy may be used to fix the positions permanently.

The near perfect alignment between the lens axis and the ferrule/fiber axis inside the resilient sleeve eliminates the need for tuning as was seen with the standard product. Once the alignment assembly is mounted into the insert, the optical components are aligned. In one embodiment, the interference fit between the alignment assembly and the insert serves to assure perpendicularity of the optical axis in the alignment assembly with the front mechanical interface of the insert.

Other types of sleeves can be used to perform the alignment. For example, it can be a solid tubular sleeve which has a very snug fit relative to the two optical elements. Likewise, although a compliant sleeve is generally preferred, it is not necessary, and the invention may be practiced with rigid sleeves. For example, the alignment can also be achieved by using an interference fit between the components and a tubular sleeve, for example utilizing a press fit insertion process.

It should be understood that other alignment approached may be used. For example, in the embodiment of FIG. 1(a), a split sleeve works very well, because the optical axis of a spherical lens is precisely located at the mechanical center of the sphere. Likewise, in FIG. 1(b), if the lens is a graded index cylindrical lens, then the optical axis is fairly well aligned to the mechanical axis of the cylinder, which tends to be adequate for multimode applications. However, if the lens in FIG. 1(b) is a refractive lens with a cylindrical body, then it is likely that the optical axis of the lens surface is not accurately aligned to the mechanical axis of the cylinder. In this case, it is often necessary to actively align the axes of the ferrule and the cylindrical lens (GRIN or refractive cylindrical lens) to achieve low loss. In this case, the assembly can be made using a solid sleeve (cylindrical shell) rather than a split sleeve. The ferrule and cylindrical lens axes are aligned within this sleeve, and then the components are affixed to the sleeve.

Figure 3:
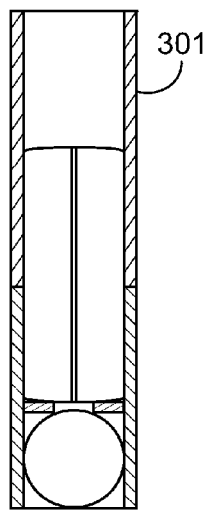
FIG. 3 shows the alignment assembly of FIG. 2b with a second split sleeve disposed around the ferrule stub.

In one embodiment, once the assembly 200 is complete, a second sleeve 301 is mounted to the free end or back end 203b of the ferrule stub 203 as shown in FIG. 3. Alternatively, it can be retained by adhesive. In another embodiment, rather than having a discrete second sleeve, the sleeve 201 can be longer such that it extends beyond the free end 203b of the ferrule stub 203 to define a cavity for receiving the ferrule 502 of the cable assembly 501. For example, referring to FIG. 7(a) an embodiment is shown having a single split sleeve 701 for holding the lens 702 and ferrule stub 703, which has an extended portion 770 for receiving a ferrule (not shown). Likewise, FIG. 7(b) shows a split sleeve 711 for holding a ferrule stub 713, which has extended portion 771 for receiving a ferrule (not shown). In the embodiment of FIG. 7(b), the lens 780 is a graded index fiber which is disposed in the ferrule stub and optically coupled with a single mode fiber 781. It should be understood that the use of a graded index fiber (lens) in the ferrule stub is an alternative configuration for all the connector embodiments disclosed herein, and, for example, in U.S. Pat. No. 7,031,567. Alternatively, the ferrule can have angle physical contact (APC) or the fiber can be AR-coated if there is an airgap between the two mating halves.

In one embodiment, an APC ferrule can also be incorporated if a return loss in the order of 65 dB is required. For example, referring to FIG. 7(c), a single split sleeve 721 having an extended portion 772 is shown for an angled-polished ferrule stub 723 optically coupled to an angled-polished ferrule 790. Alternatively, the ferrule 803 of the cable assembly 880 of FIG. 8 could be an APC ferrule.

The lens 102 functions, in one respect, to expand and collimate a relatively narrow optical beam emitted from a fiber into a relatively large beam for transmission through an air gap and into the light path of a mating structure, and, in another respect, to focus a relatively large collimated beam from the mating structuring into the fiber. Suitable lenses include any optical component which is capable of expanding/focusing a light beam and having a circular periphery to be received in the cylindrical sleeve. Suitable lens include, for example, any combination of a ball or cylindrical lens, a molded and/or machined lens, a GRIN lens or fiber, or a lens or lens assembly containing spherical or aspherical surfaces with refractive or graded index lenses, a plano-convex lens, a cylindrical drum lens, or molded lenses. A spherical ball lens is generally, although not necessarily, preferred due to excellent alignment existing between its optical and mechanical axes. The advantage of performing the lens assembly process externally to the insert body is that it is easy to handle and easy to verify that the lens unit performs as intended before it is mounted into the insert body cavity.

In one embodiment, the same ball lens is used for both single mode and multimode connectors. This reduces inventory requirements and, thus, costs. The lens may be secured to the housing in this respect using adhesive or any other known technique for securing a lens to a housing.

In one embodiment, as shown in FIGS. 1(a) and (b), the lens is a glass material which has a refractive index of 2.0. Such a lens will have its focal point on its surface. Thus, a fiber making contact with the lens will exhibit a high return loss, which is desired in particular for single mode applications.

In an alternative embodiment, the lens has a refractive index below 2 which may be preferable from an economic and availability standpoint. Lens materials having a refractive index (n) less than 2.0 are more common and less expensive. Among major manufacturers of these glasses or similar are Schott, Ohara and others. For example, the following lens materials are suitable for the present invention:

| Lens material | BK7 | SF-8 | Sapphire | LaSFN9 | PBH71 |
|---|---|---|---|---|---|
| n (1310) | 1.504 | 1.662 | 1.750 | 1.817 | 1.874 |

Although glass type lenses with an index less than 2.0 tend to be more available and less expensive, such lenses will have a focal point away from the lens surface. For example Schott glass LASF-35 has an index slightly lower than 2.0. This deviation from the desired index of 2.0 causes the focal point to be displaced from the lens surface by approximately 16 microns and with the fiber in contact with the lens and therefore offset from the focal point, a loss of approximately 0.25 dB is added to the TE product. Therefore, the fiber endface must be spaced from the surface of the lens, thereby creating an air gap.

The air gap created between the fiber (now positioned at the focal point) and the lens will add insertion loss to the system due to the index difference between the un-coated fiber and the air. Accordingly, in one embodiment, the lens is a ball lens 202 coated with an antireflective (AR) material 202a for an air/glass interface. For an air-to-glass interface, an ideal coating will have an index of sqrt(n) where n is the index of refraction of the lens material relative to air. The coating thickness is $\lambda/(4n)$ where $\lambda$ is the wavelength in air. The coating may be applied only at the region that the light path passes through the lens, or it may be applied uniformly around the ball lens 202 for simplicity and ease of manufacture (i.e., no need to align the lens in the housing).

In one embodiment, an antireflective (AR) coating is applied to the front face of the ferrule stub to minimize back reflection at the ferrule/lens interface. Such AR coatings are well known in optics. For example, using an AR coating reduces the Fresnel loss at the air/glass interface from 0.16 dB to less than 0.01 dB. Thus, the loss of a MM mated pair is reduced by 0.3 dB compared to prior art connectors described above. Further, the return loss from the glass/air interface can be made greater than 36 dB. As a result, the MM design can also be used for SM connectors, resulting in a lower-cost, lower-loss, more reliable design that reduces the number of insert parts that must be stocked.

The ferrule stub 103, 203 functions to hold the fiber stub 104, 204 in precise position relative to the lens 102 both radially and axially. In a preferred embodiment, the ferrule stub comprises an elongated ferrule 103 having a front and back orientation with a bore hole that runs from front to back. The fiber 104 is disposed in the bore hole such that it presents an end face at the front and back ends 203a, 203b of the ferrule stub. The fiber stub may be any known fiber for transmitting optical signals including, for example, single mode, multimode, or polarization maintaining, or multi-core fiber.

The ferrule stub facilitates tuning and manufacturability of the connector. For example, in one embodiment, if modal noise is introduced due to the increased number of interfaces for the single mode connector, it can be minimized by using a special fiber for the fiber stub termination which has a reduced cutoff wavelength, so that higher-order modes are attenuated more rapidly through the ferrule stub. In one embodiment, the fiber stub has a lower cutoff wavelength than that of the fiber in the cable assembly.

In one embodiment, the fiber in the ferrule stub is a premium fiber having a tighter tolerance on the outer diameter and on the core-cladding concentricity offset than standard fiber. Because only a small length of fiber is used, the additional cost of this fiber used within an alignment assembly is negligible.

The ferrule stub also facilitates manufacturability by facilitating the treatment of ferrule stubs in bulk given their small size and ease of handling. For example, while the lack of maneuverability of cable assembly makes AR-coating their endfaces difficult to do in large quantities, A/R coating short ferrule stubs can be done in large quantities. Thus, A/R coating becomes a practical way to reduce the insertion loss and reduces component costs as discussed above. Furthermore, the simple nature of the device also allows the vendor to test the antireflective coating prior to its installation in the insert housing.

Additionally, the small and maneuverable fiber stubs facilitate bulk polishing. In one embodiment, the ferrule stub is pre-polished before insertion into the alignment assembly. Both the manufacturability and the ease of inspection simplify the connector, lower cost, and improve reliability.

Although the ferrule stub is depicted herein as having only one fiber, it should be understood that other embodiments are possible, including multiple fiber stubs in a single ferrule stub.

In one embodiment, the ferrule stubs are commercially-available components, which typically come in diameters of 1.25 mm and 2.50 mm. Although the ferrule diameter itself has no influence on optical performance, generally (but not necessarily) there is a preference to use a ferrule and lens of the same size or as close as practical based on the commercial availability of the components.

Figure 2A:
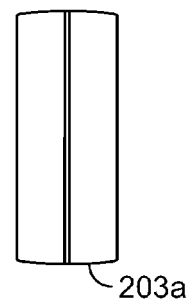
FIGS. 2(a) and 2(b) show an alternative embodiment of the alignment assembly of the present invention involving a spacer or stop between the lens and the ferrule stub as shown in FIG. 2(b).
Figure 2B:
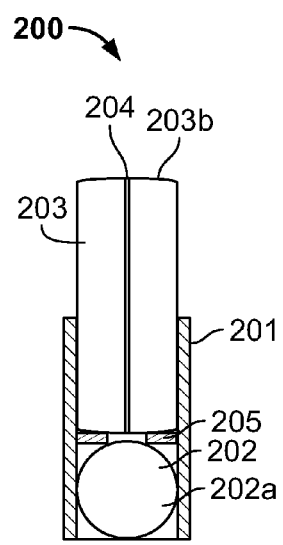

Referring to FIG. 2(b), a spacer 205 (or stop 205) functions to space the lens from the fiber endface such that the fiber endface is positioned at the focal point of the lens to create an air gap therebetween. The air gap has a number of advantages. For example, such a configuration (along with A/R coating) facilitates the use of a more economical ball lens since it is well known that lenses having a focal point on the surface of the lens tend to be more difficult to produce thus more expensive. In such an embodiment, the use of a spacer between the ferrule and the ball lens provides for the precise spacing between the end face of the ferrule and the ball lens such as the end face of the ferrule which is essentially at the focal point of the lens. In one embodiment, the spacer 205 is integral with the sleeve and thus functions also as a stop to position the lens and ferrule or ferrule stub.

Providing an air gap at the interface of the ferrule stub and the lens also allows for the independent movement of the ferrule stub with respect to the lens without damage to the components. In other words, since the components are not in contact, their vibration or other movement will not cause them to wear against each other.

Yet another advantage is the ability to adjust the air gap with the spacer to facilitate tuning of the connector for different wavelengths. Specifically, the alignment assembly of the present invention also can be adjusted to accommodate different wavelength signals by adjusting the air gap or A/R thickness. Specifically, in one embodiment, the thickness of the spacer is altered to change the distance from the second surface of the spacer to the ball lens. By way of background, it is well known that different wavelength signals result in different focal points. To couple the light effectively between the fiber and the lens, the focal point should be coincident with the surface of the fiber. Thus, for optimum coupling efficiency, the air gap should be adjustable for different wavelength signals.

In one embodiment, the alignment assembly is configured with a stop 205 to receive and position the ferrule of the cable assembly relative to the lens. For example, referring to FIG. 5, in one embodiment, the ferrule stub 203 is eliminated, and the ferrule 502 is configured to contact the spacer/stop 205 to position the ferrule end face in the alignment assembly relative to the lens 202.

Although the air gap between the lens and the ferrule/ferrule stub has advantages as discussed above, in some embodiments, it may be preferable to eliminate the air gap and have the fiber contact the lens directly—i.e. physical contact. Specifically, even though an alignment assembly with an air gap facilitates the use of a less expensive lens (i.e. one having a refractive index less than 2.0), it generally requires some mechanism to define an air gap, and an air gap requires that the fiber endface have an anti-reflective coating to provide acceptable return loss level. However, the A/R coating adds cost to the system. Likewise, the spacer or machined seat in the sleeve to define the air gap imparts complexity and cost to the system.

Having the fiber make physical contact with the lens avoids these complexities and may be preferred, especially if the loss penalty discussed above is mitigated. To that end, the focal offset and the loss penalty may be reduced/eliminated if a more expensive lens is used such that the focal point is at the surface of the lens. Alternatively, rather than a ball lens, a cylindrical lens may be used. A cylindrical lens may be configured with a certain length such that the beam exiting the fiber acting as a point source is expanded to a desired size and is collimated by the curvature of the lens surface. A graded index lens can also provide an alternative.

Notwithstanding the small penalty incurred by the slightly offset focal point of a lens with a refractive index close to n=2.0, the physical contact between fiber and lens can be used advantageously for both MM and SM connectors in that both systems can use the same lens at shared wavelengths and also take advantage of the high return loss obtained by the physical contact. This also reduces inventory costs since only one lens is used for both the single mode and multimode connectors in a preferred embodiment Although various methods can be derived for performing these basic steps, the following procedure has been found to produce satisfactory results. In one embodiment, the assembly process comprises: (a) preparing an alignment assembly 100 outside of an insert by (i) inserting a lens in a sleeve, the sleeve being cylindrical having an inner first diameter, and an outer diameter configured to be received in a borehole of an insert, the lens having a round periphery with a second diameter larger than the first diameter such that the sleeve expands to receive the lens; (b) inserting the alignment assembly in the insert; and (c) inserting a ferrule in the alignment assembly, the ferrule having a round periphery with a third diameter essentially the same as the second diameter such that the sleeve expands to receive the ferrule and squeeze the ferrule to align it within the sleeve such that a fiber in the ferrule is optically coupled to the lens.

In one embodiment, step (c) is performed prior to step (b). In such an embodiment, the ferrule may be a ferrule stub and the fiber a fiber stub. In such an embodiment, step (a) may also include disposing a second sleeve on the ferrule stub as shown in FIG. 3, such that said second sleeve extends beyond said ferrule stub to define a cavity for receiving said ferrule of said cable assembly. Alternatively, the ferrule may be the ferrule of a cable assembly and the fiber the fiber of a cable assembly such that the optical connection between the fiber of the cable assembly and lens is direct without a fiber stub in between. In another embodiment, step (c) is performed after step (b). In such an embodiment, the ferrule is generally, although not necessarily, the ferrule of a cable assembly and the fiber the fiber of a cable assembly.

In one embodiment, step (b) involves actively aligning the alignment assembly in the insert prior to affixing the assembly to the insert.

In one embodiment, step (c) involves urging the ferrule into the lens. That is, generally, although not necessarily, sustained optical performance at temperature extremes typically requires that the ferrule of the cable assembly is urged forward against the lens at all times to eliminate the effect of expansion/contraction due to differences in the material coefficients of thermal expansion (CTE). On the other hand, the effects of CTE can be minimized, however, if the choice of materials used (glass, ceramic) is such that the material CTE's are nearly similar which results in a desirable system design basically immune to the CTE effect.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. An expanded beam connector comprising:
   an insert for insertion into an outer housing, said insert having at least one bore hole for receiving an alignment subassembly;
   an alignment subassembly comprising at least:
      at least one cylindrical, compliant sleeve having an inner first diameter, and an outer diameter configured to be received in said bore hole of said insert;
      a lens disposed in said at least one cylindrical, compliant sleeve, and having a round periphery with a second diameter larger than said inner first diameter;
      wherein said at least one cylindrical, compliant sleeve is configured to at least partially receive a ferrule having a round periphery with a third diameter the same as said second diameter; and
   a cable assembly comprising at least one said ferrule having a second bore hole and at least one fiber disposed in said second bore hole such that an end face of said at least one fiber is disposed at an end face of said ferrule and optically coupled to said lens, wherein said ferrule of said cable assembly is received in said at least one cylindrical compliant sleeve, and wherein said ferrule of said cable assembly is biased to urge against said lens.

2. The expanded beam connector of claim 1, wherein said cable assembly further comprises a ferrule holder and a spring to bias said ferrule forward relative to said ferrule holder to urge against said lens to achieve physical contact.

\* \* \* \* \*